(12) United States Patent
Whiteside

(10) Patent No.: US 6,516,147 B2
(45) Date of Patent: Feb. 4, 2003

(54) SCENE RECOGNITION METHOD AND SYSTEM USING BRIGHTNESS AND RANGING MAPPING

(75) Inventor: George D. Whiteside, Lexington, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 09/740,416

(22) Filed: Dec. 19, 2000

(65) Prior Publication Data

US 2001/0031142 A1 Oct. 18, 2001

Related U.S. Application Data

(60) Provisional application No. 60/172,883, filed on Dec. 20, 1999.

(51) Int. Cl.[7] .............................................. G03B 15/02
(52) U.S. Cl. .................... 396/61; 396/100; 396/106; 396/159; 396/165; 396/187; 396/234
(58) Field of Search .................... 396/61, 165, 155, 396/157, 159, 195, 233, 234, 65, 100, 106, 121, 122, 123

(56) References Cited

U.S. PATENT DOCUMENTS 4,304,476 A * 12/1981 Bloom ........................ 396/155
6,167,200 A * 12/2000 Yamaguchi et al. .......... 396/65

* cited by examiner

Primary Examiner—David M. Gray
Assistant Examiner—Rochelle Blackman

(57) ABSTRACT

A method of controlling exposure of a scene image comprising the following steps: sensing a scene for image data; deriving values representative of a brightness map of the scene; sensing the scene for image data; deriving values representative of a range map; comparing the range map with the scene brightness map; and controlling the exposure by controlling artificial illumination upon the scene. In an alternate aspect, a system is provided for controlling exposure of a scene image comprising the following elements: at least one sensor assembly; a source of artificial illumination; and a processing means.

10 Claims, 4 Drawing Sheets

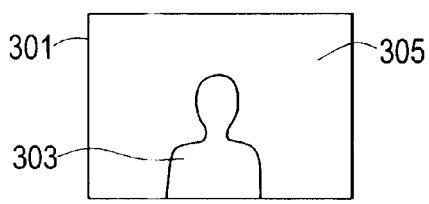
FIG. 3
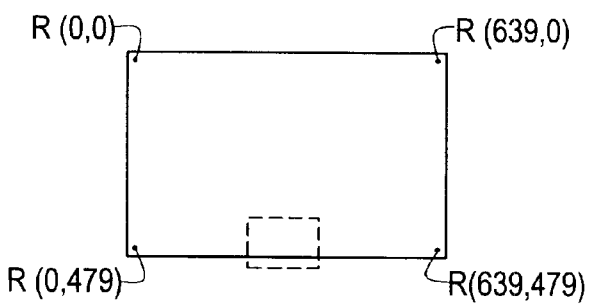
FIG. 6
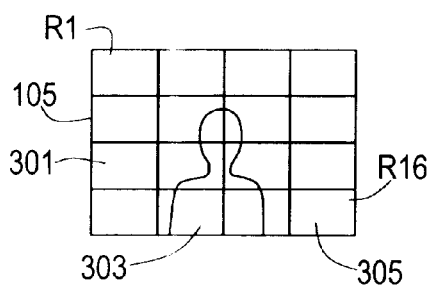
FIG. 4
FIG. 7A
FIG. 5
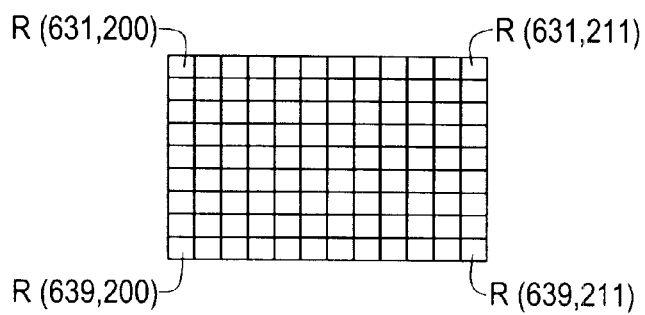
FIG. 7B

SCENE RECOGNITION METHOD AND SYSTEM USING BRIGHTNESS AND RANGING MAPPING

CROSS-REFERENCE TO RELATED APPLICATION

The present application claims the benefit of copending U.S. provisional patent application, Ser. No. 60/172,883 filed in the U.S. Patent and Trademark Office on Dec. 20, 1999.

BACKGROUND OF THE INVENTION

The present invention pertains to an automated exposure control unit and method for image recording devices and is, particularly, adapted for use in conjunction with cameras employing strobes for exposing photographic film of the self-developing type.

Capturing a properly exposed scene on film is often difficult and a wide variety of techniques have been put forth in the prior art to achieve that end in an economical manner. Proper exposure is especially difficult when a photographer is confronted with a wide variety of scene lighting and subject conditions. Correct exposure is even more difficult when the exposure employs an electronic strobe for illuminating the subject and scene. The foregoing difficulties are compounded when exposing self-developing film in low cost mass-market cameras; wherein conventional techniques of improving film picture quality done during film processing cannot be utilized and sophisticated electronic systems do not make economic sense.

Despite the problems associated with obtaining correct exposures, there are several known successful techniques for dealing with the above issues by providing enhanced exposure for a variety of scene lighting and subject conditions. For instance, commonly-assigned, U.S. Pat. No. 4,192,587 describes a proportional fill flash system for varying the time at which a source of artificial illumination is energized relative to an exposure interval by determining the range of a subject and to thereafter utilize the ranging information to vary the time in which the flash is fired so that it fires at an aperture corresponding to subject range. Commonly assigned U.S. Pat. No. 4,255,030 describes a proportional fill flash system utilizing quenching of a quench strobe at an appropriate time without determining subject range based on the integration of both ambient and flash. Commonly assigned U.S. Pat. No. 4,285,584 describes a proportional fill flash system utilizing a photometer having three zones in its overall field of view for distinguishing between background, central, and foreground portions of the scene. The output of the different segments of the scene are compared to increase or decrease the exposure depending on whether the scene is more heavily illuminated in the background or foreground. Commonly assigned U.S. Pat. No. 4,423,936 describes an exposure control unit utilizing a photometer having a multi-sensor array that detects both subject range and ambient light intensity. A comparison of range measurements identifies that scene area having the nearest object to the ambient light intensity measurements of subject and non-subject areas in order to classify scene lighting conditions and then select a corresponding program which controls the operation of the system to vary the ratio of ambient to artificial light contributions to exposure.

Despite the success of the above approaches in addressing the foregoing concerns particularly in regard to self-developing instant cameras, there is nevertheless a continuing desire to improve upon the efficiency and costs of obtaining proper exposure not only with cameras of the foregoing kind but also with digital cameras as well. In regard to digital cameras, it is highly desirable to effect highly quality printing utilizing low cost methodologies. For instance, in a camera with a digital capture mode the use of a multi-sensor array to minimize the problem adds to the overall cost to a system. Moreover, it is highly desirable to achieve the foregoing in a variety of scene lighting conditions wherein artificial illumination makes a contribution.

SUMMARY OF THE INVENTION

An object of the invention is to control the photographic exposure automatically such that the subject and non-subject areas of a scene are correctly exposed in an economical and efficient manner.

It is another object of the invention to provide a digital capture system which can utilize the material already in the system.

To achieve this and other objects, the invention is directed to a method of controlling exposure to a photosensitive element by controlling illumination of the scene through a comparison of brightness and range mapping. The method comprises: (a) sensing image data from the scene including scene brightness from a first set of a plurality of regions in the scene; (b) forming a brightness map of the scene in accordance with the brightness data corresponding to the first set of regions; (c) sensing range data from a second set of regions in the scene; (d) forming a range map to determine a subject in the scene; and, (e) comparing the range map with the scene brightness map for determining a relationship between scene brightness and the subject brightness; and, (f) controlling the exposure by controlling artificial illumination upon the scene, whereby a relationship of ambient and artificial illumination is generally maintained.

The invention is further directed to a system for controlling exposure by controlling the relationship between ambient and artificial illumination during exposure. The system comprises a sensor for sensing image data including scene brightness from a first set of a plurality of regions in a scene; a sensor for sensing range data from a second set of regions in the scene; and, processing means for (i) defining a brightness map of the scene in accordance with the brightness data corresponding to the first set of regions, (ii) defining a range map of the scene in accordance to the second set of regions to determine a subject in the scene, (iii) comparing the range map with the scene brightness map for determining a relationship between scene brightness and the subject range; and, (iv) controlling the exposure during an exposure interval by controlling artificial illumination upon the scene, whereby a relationship of ambient and artificial illumination is generally maintained.

As a result of the foregoing system and method, when the ambient brightness readings of both the scene background and scene subject are measured, control of the ambient exposure of the background is controlled by the ambient background readings and the exposure of the subject is controlled by a comparing the subject brightness to the scene brightness and by controlling the amount of artificial illumination directed at the subject by the source of artificial illumination to make up the difference in brightness values in order to give correct exposure for both the scene background and the subject. Accordingly, both the scene subject and scene background are wellexposed.

BRIEF DESCRIPTION OF THE DRAWINGS

The invention will now be set forth in detail with reference to the drawings, in which:

FIG. 3 shows a scene of which a photograph is to be taken;

FIG. 4 shows a plurality of regions used in range mapping;

FIG. 5 shows the scene of FIG. 3 superimposed on the plurality of regions of FIG. 4;

FIG. 6 shows a ranging map;

FIG. 7A shows a macroscopic view of a plurality of regions used in brightness mapping;

FIG. 7B shows an enlarged portion of the macroscopic view of FIG. 7A and shows discrete regions;

DETAILED DESCRIPTION

Figure 1:
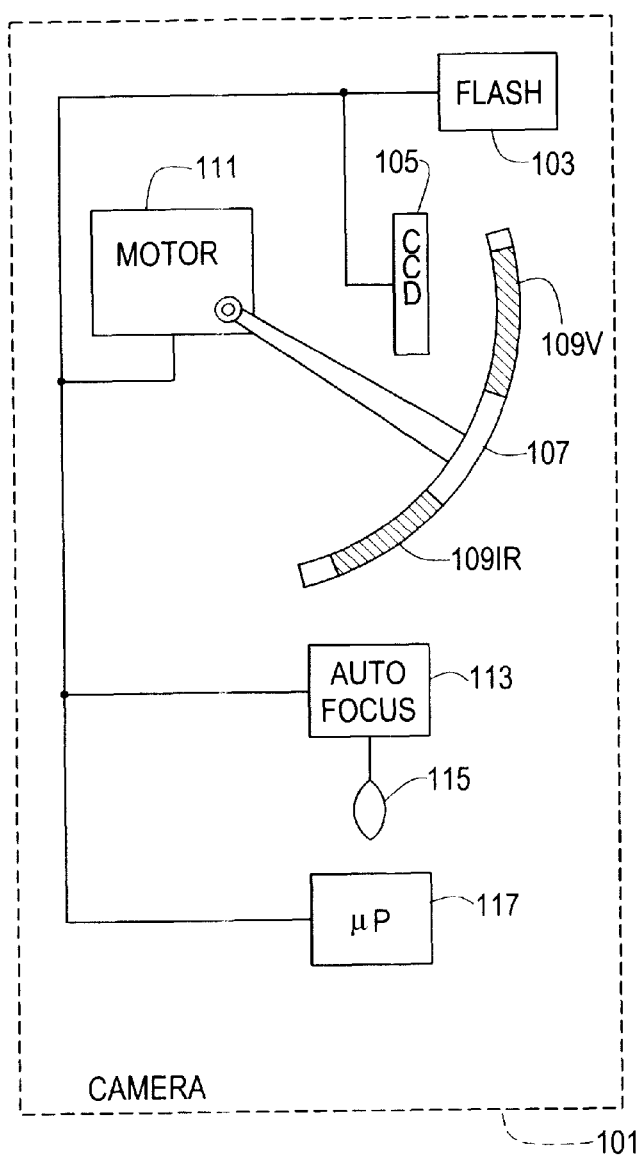
FIG. 1 shows a block diagram of a camera according to the present invention.

FIG. 1 shows a camera 101 according to the present invention. The camera 101 includes a quenchable electronic strobe unit or other suitable strobe unit 103, and a photo responsive area sensor 105, such as the CCD. A filter element 107, such as a filter sold under the model number CM 500, is disposed in front of the CCD 105 and is moved into one of two positions by motor 111 such that light directed toward the CCD 105 is intercepted by either a visible-passing filter 109V or an infrared-passing filter 109IR. Alternatively, filter element 107 can be disposed in front of the strobe 103. An auto-focus device 113, such as any auto-focus device known in the art moves a lens 115 into the appropriate focus position. The components are connected to a microprocessor 117 or other suitable control device to control the operations of the camera.

Figure 2:
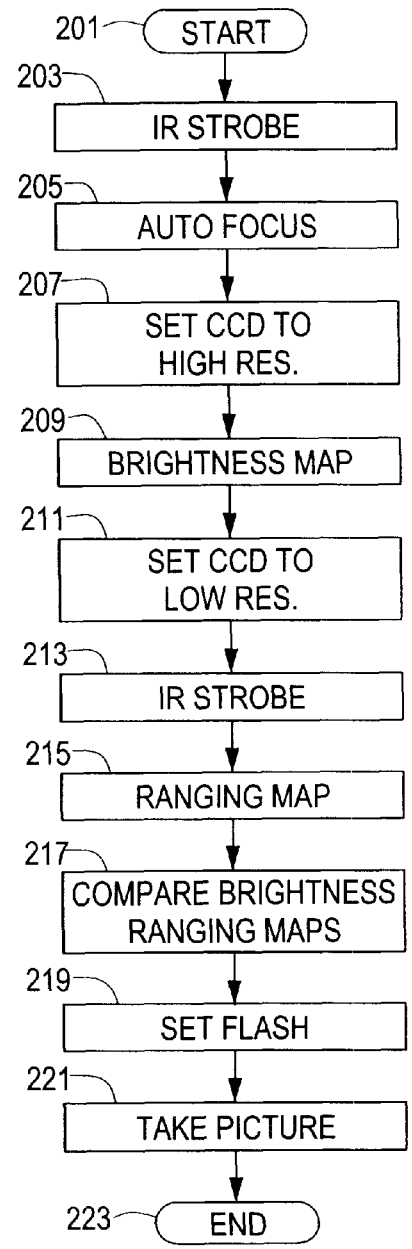
FIG. 2 shows a block diagram of operation of the camera of FIG. 1.

The camera of FIG. 1 operates as shown in the flow chart of FIG. 2. The operation starts in step 201. An IR wink or strobe pulse is emitted in step 203 by the strobe 103 (or another suitable IR source which may be separately provided) to allow an auto-focus operation in step 205 by the autofocus device 113. It will be appreciated that an auto-focus operation need not be performed, but rather a set lens can be used that if desired could be manually set. The CCD is set to high resolution in step 207 so that a brightness map of the scene (subject and background) to be photographed can be formed in step 209. In the exemplary embodiment, the visible-passing filter 109V is located in front of the CCD 105 so that the brightness map is formed with visible light. In step 211, the CCD is set to low resolution, and another IR wink or strobe pulse is emitted in step 213 so that a ranging map of the scene can be formed in step 215. In the exemplary embodiment, the infrared-passing filter 1O91R is located in front of the CCD 105. The brightness and ranging maps are compared in step 217, and the flash is set in step 219 to provide the appropriate level of backfill for the subject and the background. With this flash setting, the picture is taken in step 221, and the operation ends in step 223.

The operation of forming the ranging map in step 215 will be explained with reference to FIGS. 3–6. FIG. 3 shows a view of CCD 105 in low resolution divided into sixteen exemplary regions R1–R16, although, as noted above, the number of regions capable of being formed by the CCD typically r ranges from ten to 500 in low resolution. FIG. 5 shows the same scene as in FIG. 3 except that it is divided into the sixteen regions corresponding to regions R1–R16 of FIG. 4 and thus shows how CCD 105 in low resolution divides scene 301 into the regions. In each of the regions R1–R16 of FIG. 5, the range is determined, and a near or far determination is made for each of the regions. As a result, the ranging map 601 of FIG. 6 is obtained. In this ranging map 601, regions R1–R5, R8, R9, R12, R13, and R16 corresponding mostly to the background 305 of the scene 301, are determined to be far regions, while regions R6, R7, F10, R11, R14 and R15, corresponding mostly to the subject 303, are determined to be near regions. Of course, it is not necessary to use a binary near/far distinction; instead, varying distance ranges could be used.

While the exemplary embodiment forms the ranging map with the CCD in low resolution, it forms the brightness map with the CCD in high resolution, which will be explained with reference to FIGS. 7A and 7B. In high resolution, each pixel discernible by the CCD can be a separate region; alternatively, a resolution intermediate between the low resolution and the maximum resolution of the CCD can be used. If the CCD is capable of VGA resolution (640 pixels across by 480 pixels down), the regions range from R(0,0) in the upper left corner to R(639,0) in the upper right corner to R(0,479) in the lower left corner to R(639,479) in the lower right corner, as indicated in FIG. 7A. The portion of the CCD framed in dotted lines in FIG. 7B is shown enlarged in FIG. 7B, which shows discrete regions ranging from R(631,200) to R(631,211) to R(639,200) to R(639,211).

Figure 8:
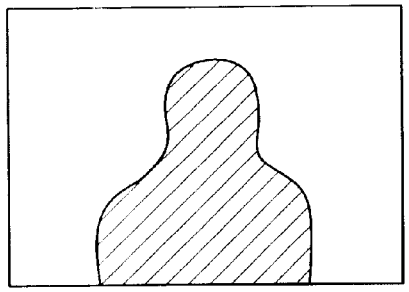
FIG. 8 shows the scene in which the subject is illuminated more dimly than the background.
Figure 9:
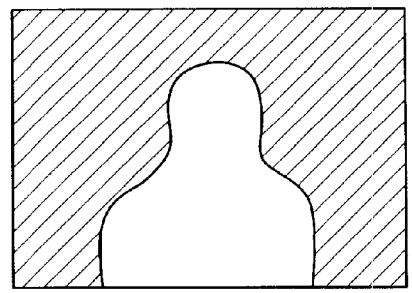
FIG. 9 shows a scene in which the subject is illuminated more brightly than the background.

The operation of comparison in step 217 will now be explained with reference to FIGS. 6, 8 and 9. As explained above, FIG. 8 shows a situation in which the subject is illuminated more dimly than the background, while FIG. 9 shows the opposite situation. The brightness levels in the brightness map obtained in step 209 are compared with ranging map 601. If the near regions are darker than the far regions, the situation in FIG. 8 is recognized, while if the opposite is true, the situation in FIG. 9 is recognized. The flash is set accordingly to contribute to the exposure. For instance, in some circumstances if the subject is significantly frontlit, the flash need not be fired.

Figure 12:
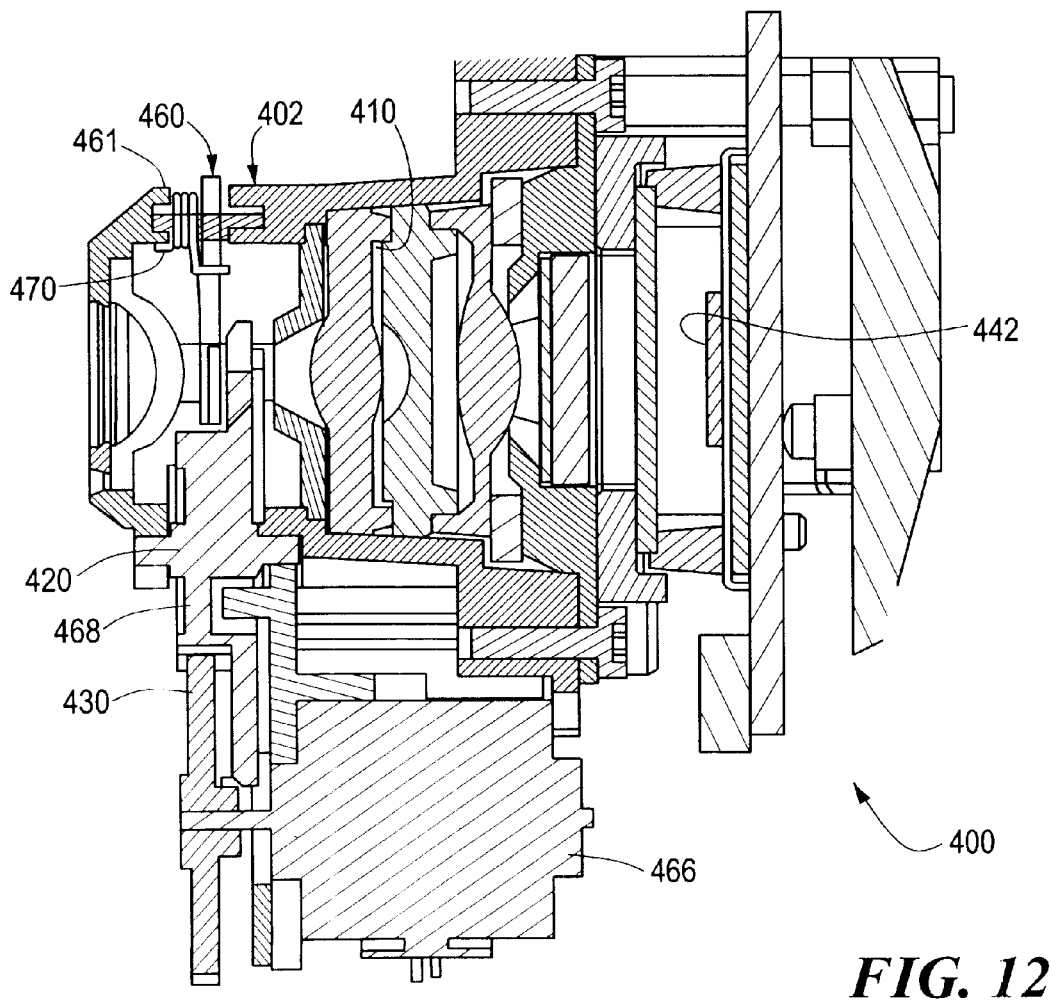
Figure 11:
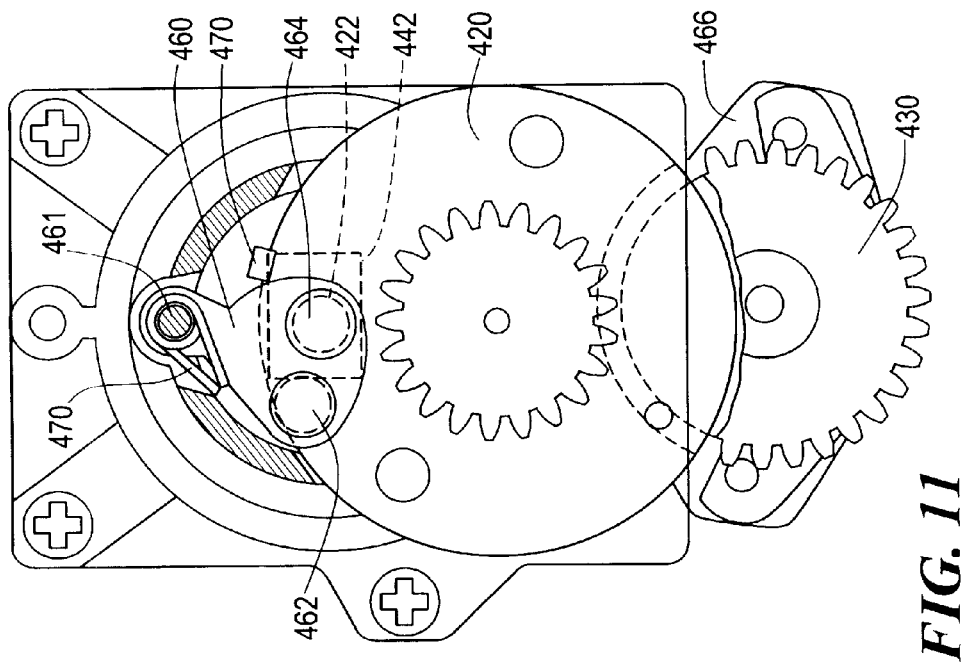
FIG. 11 is a view similar to FIG. 10, but illustrating the device in yet another mode of operation; and, FIG. 12 is a cross-sectional view illustrating the system of FIG. 10.
Figure 10:
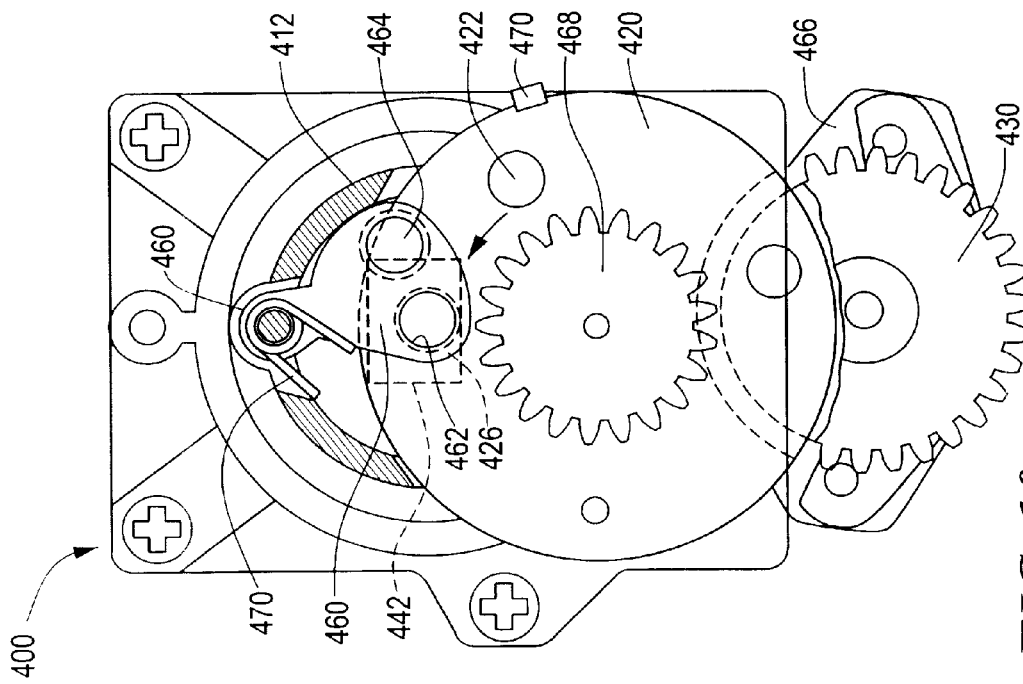
FIG. 10 is an elevation view of another embodiment of an exposure control device with, however, portions removed for clarity in illustrating its construction and one mode of operation.

FIGS. 10–12 illustrate portions of an exposure control unit 400. The exposure control unit 400 is similar that described in commonly assigned U.S. patent application, Ser. No. 09/133,661 filed Aug. 2, 1998. Hence, only those portions of the exposure control unit 400 which are necessary to understand the present invention will be described since a detailed description thereof is incorporated herein and made a part hereof. The unit 400 includes an aperture/lens disc 420 that is rotatably mounted in the housing assembly 402. The aperture/lens disc 420 is indexed under the control of a stepper motor 466 by means of a spur gear 430 that meshes with a gear 468. A set of different sized apertures 422, 426 are selectively rotated into and out of coincidence with the CCD image sensor 442. Although not shown, the apertures 422, 426 can be provided with lenses of a suitable variety such as close-up, wide angle, or telephoto.

A filter assembly 460 is rotationally mounted on a shaft 461 within the housing 402 before the lens assembly 410 and is biased by a torsion spring 470 to rest against a segment 412 of the housing assembly 402, whereby a visible light pass filter element 462 is positioned to be in overlying relationship to an aperture 426. During pre-exposure to obtain the scene brightness mapping, the image sensor 442 is enabled and the visible pass filter element 462 allows visible light from the scene to be passed to the sensor, whereby scene brightness measurements for each image sensing region of the sensor can be achieved. These image sensing regions of the sensor, of course, correspond to scene portions that are to be sensed for establishing the scene brightness map. The signals from the sensor are forwarded to a system controller (not shown).

To effect a range determining function while still in the pre-exposure mode, the aperture/lens disc 420 is rotated in a counterclockwise direction, whereby a tab 423 on the disc drives the filter assembly 460 against the bias of the spring so that an infrared pass filter element 464 is placed in overlying relationship to the CCD image sensor 442, while the aperture 426 is now in overlying relationship to the image sensor. In this step, the image sensor 442 can be operated in a low resolution mode for determining a range map distinguishing subject areas relative to the nonsubject areas The flash is operated to illuminate the scene and the resulting reflected scene brightness will pass through the IR pass filter 464 to the sensor 442; whereby range information for each sensor region can be determined consistant with the wink IR ranging technique described in commonly-assigned U.S. Pat. No. 4,785,322. Also, the present invention envisions the use of differently configured image acquisition modules with a variety of techniques for presenting an IR filter over such a module, such as by moving an IR filter in front of the acquisition module by means of a stepper motor or solenoid.

A system controller (not shown) includes a logic circuit board includes a micro-controller circuit that which receives electrical signals from the various camera elements and, in turn, controls operation of the stepper motor and the CCD as well as strobe and camera shutter mechanism logic circuit board. The logic circuit board includes a microprocessor that is operable for decoding signals from, for instance, the sensor for the scene brightness and range determining steps during different modes of operation. The logic circuit includes a conventional, electronically erasable memory section which includes appropriate numbers of look-up tables, each of which employ combinations of the exposure parameters of subject range, flash mode selection, pre-exposure scene brightness information to define the desired memory cell address. The present invention contemplates establishing the scene brightness and ranging maps, as well as comparing the maps to provide a relationship between the two that controls the strobe firing intervals for each and every combination of the scene brightness and ranging maps. The logic circuit will control when the strobe will be fired and quenched during an exposure cycle so that a desired fill flash ratio between ambient and flash is maintained despite wide variances in scene lighting and subject ranges that exist.

Although illustrative embodiments of the invention have been set forth, those skilled in the art will recognize that other embodiments can be realized within the scope of the invention. For example, the image sensing CCD can be operated in only one resolution, so that the ranging and brightness information can be taken simultaneously. In other words, a single set of data can be used to determine brightness and ranging. Also, the system and method described above do not have to be implemented in a camera, but find utility in any art in which correct illumination of subjects under a variety of lighting conditions are an issue.

What is claimed is:

1. A method of controlling exposure of a scene image comprising the steps of;
    (a) sensing a scene for image data including scene brightness data from at least a first set of a plurality of regions of the scene including a subject region;
    (b) deriving values representative of a brightness map of the scene in accordance with scene brightness data values corresponding to each of a first set of regions;
    (c) sensing the scene for image data including range data from at least a second set of regions in the scene;
    (d) deriving values representative of a range map in accordance with range data values corresponding to each of the second set of regions and utilizing the values representative of a range map to determine a subject in the scene; and,
    (e) comparing the range map with the scene brightness map for determining a relationship between scene brightness and the subject brightness; and,
    (f) controlling the exposure by controlling artificial illumination upon the scene, whereby a relationship of ambient and artificial illumination is generally obtained based on the relationship between scene brightness and the subject brightness.

2. The method of claim 1 wherein said step of controlling the artificial illumination controls firing intervals of a strobe for each and every combination of the scene brightness and ranging maps.

3. The method of claim 1 wherein one of the brightness sensing or range sensing is performed in a first sensor resolution mode and the other of the range sensing or brightness sensing is performed in a second sensor resolution mode.

4. The method of claim 1 wherein the brightness and range sensing are performed in one resolution mode.

5. The method of claim 1 wherein said range and brightness sensing steps are performed generally simultaneously.

6. A system of controlling exposure of a scene image, the system comprises:
    at least one sensor assembly for sensing image data including scene brightness from a first set of a plurality of regions in a scene; said sensor assembly is operable for sensing range data from a second set of generally independent regions in the scene; a source of artificial illumination; and,
    processing means for:
        (i) defining a brightness map of the scene in accordance with the brightness data corresponding to each of the regions in the first set of regions,
        (ii) defining a range map of the scene in accordance to the second set of regions to determine a subject in the scene,
        (iii) comparing the range map with the scene brightness map for determining a relationship between scene brightness and the subject range; and,
        (iv) controlling the exposure by controlling a strobe artificial illumination upon the scene, whereby a relationship of ambient and artificial illumination is generally obtained based on the relationship between scene brightness and the subject brightness.

7. The system of claim 6 wherein said sensor senses one of the scene brightness and the other of the scene ranging in a first resolution mode and said sensor senses the other of the subject range and scene brightness in a second resolution mode.

8. The system of claim 6 wherein said sensor is operable for sensing the scene brightness and ranging in a single resolution mode.

9. The system of claim 6 wherein said sensor assembly includes an infrared pass filter assembly that is operable in one condition to allow ambient and artificial illumination from a scene to impinge on said sensor, and in another condition allows infrared from the scene to impinge on said sensor.

10. The system of claim 6 wherein said processing means is operable for
controlling the artificial illumination by a controlling a strobe for each and every combination of the scene brightness and ranging maps.

* * * * *